United States Patent
Kudo

(10) Patent No.: US 11,915,919 B2
(45) Date of Patent: Feb. 27, 2024

(54) MASS SPECTROMETER

(71) Applicant: SHIMADZU CORPORATION, Kyoto (JP)

(72) Inventor: Tomoya Kudo, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 378 days.

(21) Appl. No.: 17/600,353

(22) PCT Filed: May 27, 2019

(86) PCT No.: PCT/JP2019/020809
§ 371 (c)(1),
(2) Date: Sep. 30, 2021

(87) PCT Pub. No.: WO2020/240640
PCT Pub. Date: Dec. 3, 2020

(65) Prior Publication Data
US 2022/0130656 A1  Apr. 28, 2022

(51) Int. Cl.
H01J 49/04 (2006.01)
G01N 30/72 (2006.01)
H01J 49/00 (2006.01)

(52) U.S. Cl.
CPC ........ *H01J 49/045* (2013.01); *G01N 30/7266* (2013.01); *H01J 49/0009* (2013.01)

(58) Field of Classification Search
CPC . H01J 49/045; H01J 49/0009; G01N 30/7266
See application file for complete search history.

(56) References Cited

U.S. PATENT DOCUMENTS

2019/0013189 A1  1/2019  Okumura et al.
2020/0158703 A1  5/2020  Fukui

FOREIGN PATENT DOCUMENTS

WO  2017/056173 A1  4/2017
WO  2019/053847 A1  3/2019

OTHER PUBLICATIONS

International Search Report for PCT/JP2019/020809 dated, Aug. 6, 2019 (PCT/ISA/210).
Written Opinion of the International Searching Authority for PCT/JP2019/020809 dated Aug. 6, 2019 (PCT/ISA/237).

*Primary Examiner* — Nicole M Ippolito
*Assistant Examiner* — Hanway Chang
(74) *Attorney, Agent, or Firm* — Sughrue Mion, PLLC

(57) ABSTRACT

A first spray unit (201) sprays a first sample into a first space (20) while charging the first sample. A second spray unit (202) sprays a second sample into the first space (20) or a second space (21) communicating with the first space (20) while charging the second sample. A determination unit (62) determines whether or not the second sample is sprayed from the second spray unit (202). A gas supply unit (74) supplies gas into the first space (20). A control unit (63) controls supply of the gas from the gas supply unit (74). In a case where the determination unit (62) determines that the second sample is sprayed from the second spray unit (202), the control unit (63) starts the supply of the gas from the gas supply unit (74) into the first space (20).

7 Claims, 5 Drawing Sheets

MASS SPECTROMETER

TECHNICAL FIELD

The present invention relates to a mass spectrometer.

BACKGROUND ART

As an example of a device for analyzing a component contained in a liquid sample, a mass spectrometer is known (see, for example, Patent Documents 1 and 2 below.). The mass spectrometer includes an ion source and a mass spectrometry unit. In the ion source, a component in a sample is ionized in an ionization chamber. The ionized components in the sample are separated according to a mass-to-charge ratio in the mass spectrometry unit, and the separated components are detected.

For example, in a mass spectrometer disclosed in Patent Document 1, two probes are provided in an ion source. One probe is a main probe that sprays a sample to be analyzed into an ionization chamber as charged microdroplets. The other probe is a sub-probe that sprays a standard sample for mass calibration into the ionization chamber as charged microdroplets.

Patent Document 2 discloses, as an example of an ionization probe used in a liquid chromatograph mass spectrometer, nano ESI and micro ESI in which a flow rate of a mobile phase is reduced from a nL/min level to a μL/min level.

PRIOR ART DOCUMENTS

Patent Documents

Patent Document 1: WO 2017/056173 A
Patent Document 2: WO 2019/053847 A

SUMMARY OF THE INVENTION

Problems to be Solved by the Invention

In a case of the configuration including two probes as in Patent Document 1, there is a possibility that the standard sample sprayed from the sub-probe adheres to the main probe. In a case where the standard sample adheres to an introduction path of the sample to be analyzed in the main probe, there is a possibility that the detection sensitivity is lowered or destabilized, and thus it is preferable to prevent the standard sample from adhering to the introduction path.

In particular, in a case where the sample to be analyzed is ionized at a low flow rate as in Patent Document 2, the introduction path of the sample to be analyzed in the main probe has an extremely small diameter. For this reason, in a case where the sub-probe that ionizes the standard sample is used in combination, there is a possibility that the standard sample adheres to the introduction path having a small diameter of the main probe, which may cause clogging.

The problem as described above is not limited to the case of spraying the sample to be analyzed and the standard sample, and is a problem that may similarly occur in a mass spectrometer including a first spray unit that sprays a first sample and a second spray unit that sprays a second sample.

The present invention has been made in view of the above circumstances, and an object of the present invention is to provide a mass spectrometer having a configuration including a first spray unit that sprays a first sample and a second spray unit that sprays a second sample, in which the second sample sprayed from the second spray unit can be prevented from adhering to the first spray unit.

Means for Solving the Problems

According to a first aspect of the present invention, a mass spectrometer includes a first spray unit, a second spray unit, a determination unit, a gas supply unit, and a control unit. The first spray unit sprays a first sample into a first space. The second spray unit sprays a second sample into the first space or a second space communicating with the first space. The determination unit determines whether or not the second sample is sprayed from the second spray unit. The gas supply unit supplies gas that prevents the second sample sprayed into the first space or an ion derived from the second sample from reaching the first spray unit. The control unit controls supply of the gas from the gas supply unit. In a case where the determination unit determines that the second sample is sprayed from the second spray unit, the control unit starts the supply of the gas from the gas supply unit into the first space.

Effects of the Invention

According to the first aspect of the present invention, when the second sample is sprayed from the second spray unit, the second sample sprayed from the second spray unit can be prevented from adhering to the first spray unit by the gas supplied from the gas supply unit into the first space.

BRIEF DESCRIPTION OF THE DRAWINGS

FIG. 5 is a timing chart for describing a variation of the control by the control unit.

MODE FOR CARRYING OUT THE INVENTION

1. Overall Configuration of Mass Spectrometer

Figure 1:
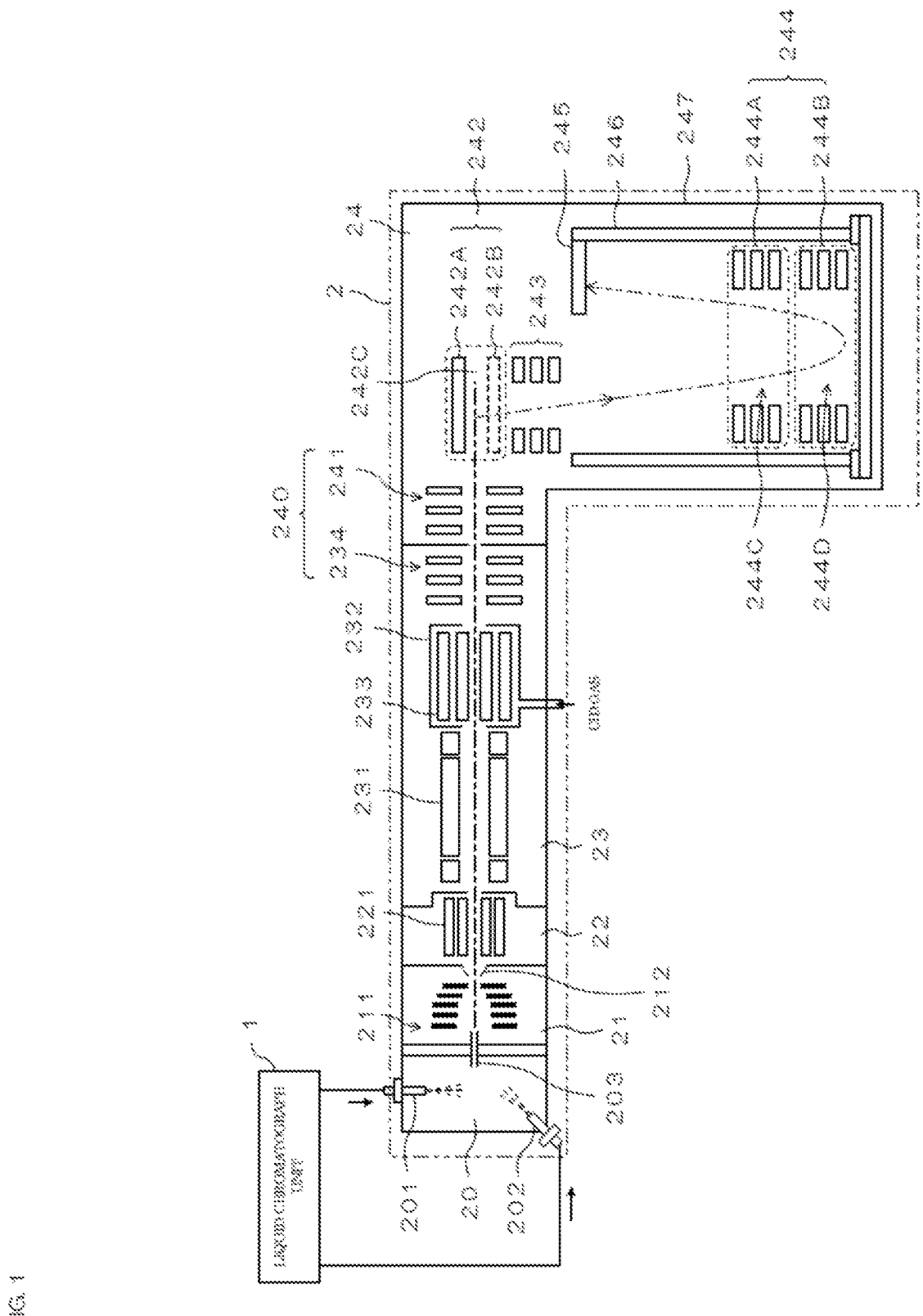
FIG. 1 is a schematic view showing an embodiment of a mass spectrometer.

FIG. 1 is a schematic view showing an embodiment of a mass spectrometer. The mass spectrometer in the present embodiment is a liquid chromatograph mass spectrometer that performs mass spectrometry on components in a sample to be analyzed separated by liquid chromatography. The mass spectrometer includes a liquid chromatograph unit 1 and a mass spectrometry unit 2.

The liquid chromatograph unit 1 includes a column (not illustrated). During analysis, a mobile phase containing an organic solvent such as, for example, acetonitrile or methanol is introduced into the column. A predetermined amount of sample is injected into the mobile phase introduced into the column. The mobile phase into which a sample is injected is introduced into the column as a sample to be analyzed, and components in the sample to be analyzed are separated in a process of passing through the column. The component in the sample to be analyzed separated by the column are sequentially supplied to the mass spectrometry unit 2.

The mass spectrometry unit 2 is composed of, for example, a quadrupole time-of-flight (Q-TOF) mass spectrometer. An ionization chamber 20, a first intermediate chamber 21, a second intermediate chamber 22, a third intermediate chamber 23, an analysis chamber 24, and the like are formed inside the mass spectrometry unit 2. The inside of the ionization chamber 20 is substantially at atmospheric pressure. The first intermediate chamber 21, the second intermediate chamber 22, the third intermediate chamber 23, and the analysis chamber 24 are set to a vacuum state by driving of a vacuum pump (not illustrated). The ionization chamber 20, the first intermediate chamber 21, the second intermediate chamber 22, the third intermediate chamber 23, and the analysis chamber 24 communicate with each other, and are configured such that the degree of vacuum increases stepwise in this order.

The ionization chamber 20 is provided with a main probe 201 and a sub-probe 202. Each of the probes 201 and 202 sprays a liquid sample by, for example, the electrospray ionization (ESI) method. In each of the probes 201 and 202, a sample is charged as a charge is applied to the sample, and an ion derived from each component in the sample is generated. As described above, the ionization chamber 20 constitutes a first space in which the charged sample is sprayed from each of the probes 201 and 202. Each of the probes 201 and 202 may spray and ionize a liquid sample by, for example, the atmospheric pressure chemical ionization (APCI) method, without limitation to the ESI method.

The main probe 201 constitutes a first spray unit that sprays a sample to be analyzed as a first sample into the ionization chamber 20 while charging the sample. The sub-probe 202 constitutes a second spray unit that sprays a standard sample for mass calibration as a second sample into the ionization chamber 20 while charging the standard sample. The standard sample for mass calibration is a sample whose mass-to-charge ratio is known, and is sprayed into the ionization chamber 20 before or during an analysis.

In the present embodiment, the main probe 201 sprays the sample to be analyzed downward from above. In contrast, the sub-probe 202 sprays the standard sample obliquely upward from below. However, the direction of the sample sprayed from each of the probes 201 and 202 is not limited to the above directions. For example, the directions of the samples sprayed from the probes 201 and 202 may be parallel to each other or may intersect each other. Further, the probes 201 and 202 may spray the sample in directions facing each other.

The first intermediate chamber 21 communicates with the ionization chamber 20 via a heating capillary 203 including a thin tube. Further, the second intermediate chamber 22 communicates with the first intermediate chamber 21 via a skimmer 212 including a small hole. The first intermediate chamber 21 and the second intermediate chamber 22 are respectively provided with ion guides 211 and 221 for sending ions to a subsequent stage while converging the ions.

The third intermediate chamber 23 is provided with, for example, a quadrupole mass filter 231, a collision cell 232, and the like. Collision induced dissociation (CID) gas composed of inert gas such as argon gas or nitrogen gas is continuously or intermittently supplied into the collision cell 232. A multipole ion guide 233 is provided in the collision cell 232.

Ions flowing from the second intermediate chamber 22 into the third intermediate chamber 23 are separated according to a mass-to-charge ratio by the quadrupole mass filter 231, and only an ion having a specific mass-to-charge ratio passes through the quadrupole mass filter 231. An ion that passes through the quadrupole mass filter 231 is introduced into the collision cell 232 as a precursor ion, and comes into contact with CID gas to be cleaved, so that a product ion is generated. The generated product ion is temporarily held by the multipole ion guide 233 and released from the collision cell 232 at a predetermined timing.

In the third intermediate chamber 23 and the analysis chamber 24, a transfer electrode unit 240 is provided across these chambers. The transfer electrode unit 240 includes one or a plurality of first electrodes 234 provided in the third intermediate chamber 23 and one or a plurality of second electrodes 241 provided in the analysis chamber 24. The first electrode 234 and the second electrode 241 are formed in an annular shape, and are arranged coaxially. Ions (product ions) emitted from the collision cell 232 are converged by passing through the inner side of a plurality of the electrodes 234 and 241 in the transfer electrode unit 240.

In addition to the second electrode 241, the analysis chamber 24 is provided with an orthogonal acceleration unit 242, an acceleration electrode unit 243, a reflectron 244, a detector 245, a flight tube 246, and the like. The flight tube 246 is, for example, a hollow member whose both end portions are opened, and has the reflectron 244 arranged inside.

An ion is incident on the orthogonal acceleration unit 242 from the transfer electrode unit 240. The orthogonal acceleration unit 242 includes a pair of electrodes 242A and 242B facing each other with a space between them. A pair of the electrodes 242A and 242B extend in parallel to an incident direction of an ion from the transfer electrode unit 240, and an orthogonal acceleration region 242C is formed between these electrodes.

One of the electrodes, the electrode 242B, is composed of a grid electrode having a plurality of openings. An ion incident on the orthogonal acceleration region 242C is accelerated in a direction orthogonal to the incident direction of the ion, passes through the opening of the electrode 242B, and is guided to the acceleration electrode unit 243. An ion emitted from the orthogonal acceleration unit 242 is further accelerated by the acceleration electrode unit 243 and introduced into the flight tube 246.

The reflectron 244 provided in the flight tube 246 includes one or a plurality of first electrodes 244A and one or a plurality of second electrodes 244B. The first electrode 244A and the second electrode 244B are formed in an annular shape, and are arranged coaxially along an axis of the flight tube 246. Different voltages are applied to the first electrode 244A and the second electrode 244B.

An ion introduced into the flight tube 246 is guided into a flight space formed in the flight tube 246, flies in the flight space, and then enters the detector 245. Specifically, the ion introduced into the flight tube 246 is decelerated in a first region 244C formed on the inner side of the first electrode 244A and then reflected by a second region 244D formed on the inner side of the second electrode 244B, so that the ion turns back in a U shape and enters the detector 245.

The time of flight from when an ion is emitted from the orthogonal acceleration unit 242 to when the ion is incident on the detector 245 depends on a mass-to-charge ratio of the ion. Therefore, a mass-to-charge ratio of each ion is calculated based on time of flight of each ion emitted from the orthogonal acceleration unit 242 so that a mass spectrum can be obtained.

2. Configuration of Main Probe

Figure 2:
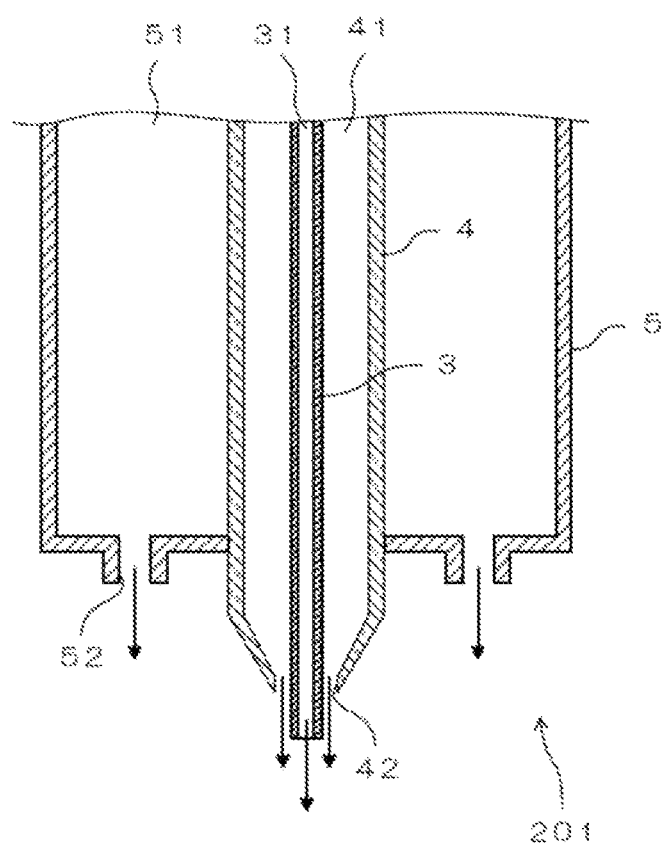
FIG. 2 is a schematic cross-sectional view showing a configuration example of a main probe.

FIG. 2 is a schematic cross-sectional view illustrating a configuration example of the main probe 201. The main probe 201 includes a capillary 3, a first gas supply pipe 4, a second gas supply pipe 5, and the like. The capillary 3, the first gas supply pipe 4, and the second gas supply pipe 5 are coaxially arranged.

The capillary 3 is a tubular member in which an introduction path 31 for introducing a sample to be analyzed is formed. An inner diameter of the introduction path 31 is minute, and the sample to be analyzed is introduced into the ionization chamber 20 from the tip of the capillary 3 at a low flow rate of a flow rate (micro flow rate) at a μL/min level or a flow rate (nano flow rate) at a nL/min level. The inner diameter of the introduction path 31 is, for example, 10 to 100 μm, but is not limited to this. Further, the flow rate of the sample to be analyzed in the introduction path 31 is set to, for example, a value of 50 μL/min or less, but is not limited to this.

The first gas supply pipe 4 covers the outer side of the capillary 3. A first gas supply path 41 for supplying nebulizer gas is formed between an outer peripheral surface of the capillary 3 and an inner peripheral surface of the first gas supply pipe 4. The nebulizer gas is, for example, nitrogen gas or dry air for atomizing the sample to be analyzed. A tip portion of the first gas supply pipe 4 is tapered. In this manner, a cross-sectional area of the first gas supply path 41 gradually decreases toward the tip. A tip portion of the first gas supply path 41 constitutes an annular injection port 42 through which the nebulizer gas is injected.

A tip portion of the capillary 3 projects from the tip of the first gas supply pipe 4. Therefore, the nebulizer gas jetted from the injection port 42 is introduced into the ionization chamber 20 along the tip portion of the capillary 3, and is diffused into the ionization chamber 20 so as to spread from the tip of the capillary 3. At the time of analysis, voltage is applied to the capillary 3, so that the sample to be analyzed introduced from the capillary 3 into the ionization chamber 20 is charged. The charged sample to be analyzed is sprayed into the ionization chamber 20 by the nebulizer gas injected from the injection port 42, and diffused into the ionization chamber 20 as ions.

The second gas supply pipe 5 covers the outer side of the first gas supply pipe 4. A second gas supply path 51 for supplying heating gas is formed between an outer peripheral surface of the first gas supply pipe 4 and an inner peripheral surface of the second gas supply pipe 5. The heating gas is, for example, nitrogen gas or dry air for heating the atomized sample to be analyzed. An annular injection port 52 is formed on a distal end surface of the second gas supply pipe 5. The heating gas heated to a predetermined temperature in advance is supplied from the injection port 52 into the ionization chamber 20. Note that the injection port 52 does not need to be annular, and may have other shapes. Further, the second gas supply pipe 5 is not necessarily arranged coaxially with the capillary 3 and the first gas supply pipe 4.

3. Configuration of Sub-Probe

The sub-probe 202 has the same configuration as the main probe 201 except that the second gas supply pipe 5 is not provided. Therefore, the configuration of the sub-probe 202 will be described below using the same reference numerals as those of the main probe 201.

The sub-probe 202 includes the capillary 3, the first gas supply pipe 4, and the like arranged coaxially. A standard sample for mass calibration is introduced into the ionization chamber 20 from the tip of the capillary 3. The nebulizer gas is injected from the annular injection port 42 formed at the tip of the first gas supply pipe 4, and is diffused into the ionization chamber 20 so as to spread from the tip of the capillary 3. At the time of mass calibration, voltage is applied to the capillary 3, so that the standard sample introduced from the capillary 3 into the ionization chamber 20 is charged. The charged standard sample is sprayed into the ionization chamber 20 by the nebulizer gas injected from the injection port 42, and diffused into the ionization chamber 20 as ions.

4. Electrical Configuration of Mass Spectrometer

Figure 3:
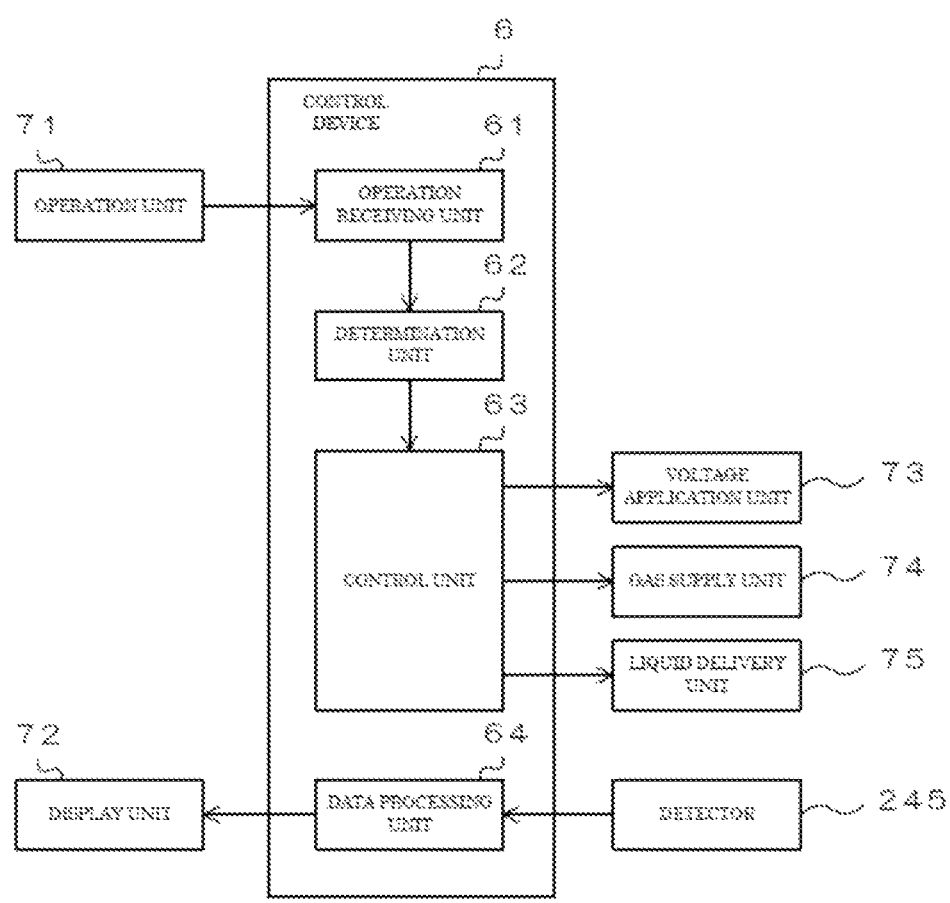
FIG. 3 is a block diagram showing an example of an electrical configuration in the mass spectrometer of FIG. 1.

FIG. 3 is a block diagram showing an example of an electrical configuration in the mass spectrometer of FIG. 1. Operation of the mass spectrometer is controlled by a control device 6. The control device 6 includes, for example, a processor such as a central processing unit (CPU).

The control device 6 functions as an operation receiving unit 61, a determination unit 62, a control unit 63, a data processing unit 64, and the like as the processor executes a computer program. In addition to the detector 245 described above, an operation unit 71, a display unit 72, a voltage application unit 73, a gas supply unit 74, a liquid delivery unit 75, and the like are electrically connected to the control device 6.

The operation unit 71 is composed of an input device such as a keyboard or a mouse. The display unit 72 is composed of for example, a display device such as a liquid crystal display. The user can instruct operation of the mass spectrometer and perform various types of setting by operating the operation unit 71. Further, the user can check various types of information such as a mass spectrum displayed on the display unit 72. The operation unit 71 and the display unit 72 may be integrally configured by an operation display device including a touch panel.

The voltage application unit 73 applies voltage to each unit provided in the mass spectrometer in addition to the main probe 201 and the sub-probe 202. The gas supply unit 74 includes, for example, a valve and a pipe, and supplies various types of gas such as the nebulizer gas and the heating gas. Specifically, the gas supply unit 74 supplies the nebulizer gas and the heating gas from the main probe 201 into the ionization chamber 20. Further, the gas supply unit 74 supplies the nebulizer gas from the sub-probe 202 into the ionization chamber 20.

The liquid delivery unit 75 includes, for example, a pump and a pipe, and delivers various types of liquid such as a sample to be analyzed and a standard sample. Specifically, the liquid delivery unit 75 supplies a sample to be analyzed to the main probe 201. Further, the liquid delivery unit 75 supplies a standard sample to the sub-probe 202. The liquid delivery unit 75 in the present embodiment can supply cleaning solution to the sub-probe 202. The cleaning solution supplied to the sub-probe 202 is sprayed from the capillary 31 of the sub-probe 202 into the ionization chamber 20. The cleaning solution contains any of water, acetonitrile, methanol, ethanol, and isopropanol. A mobile phase used in the liquid chromatograph unit 1 may be supplied to the sub-probe 202, and the mobile phase may be injected from the sub-probe 202 as the cleaning solution.

The operation receiving unit 61 performs processing of receiving input operation to the operation unit 71. That is, in a case where operation is performed on the operation unit 71, an input signal is received by being input to the operation receiving unit 61, and processing according to the input signal is performed by the control device 6.

The determination unit 62 determines whether or not a standard sample is sprayed from the sub-probe 202. For example, when device calibration is performed before an analysis, the user operates the operation unit 71 to issue a command to deliver a standard sample to the sub-probe 202. In this case, based on input operation received by the operation receiving unit 61, the determination unit 62 determines that the standard sample is sprayed from the sub-probe 202, that is, the standard sample is being sprayed from the sub-probe 202 or is sprayed after predetermined time.

The control unit 63 controls operation of each unit such as the voltage application unit 73, the gas supply unit 74, and the liquid delivery unit 75. The control unit 63 controls the voltage application unit 73 to control voltage applied to the main probe 201 and the sub-probe 202. Further, the control unit 63 controls supply of gas from the gas supply unit 74 to the main probe 201 and the sub-probe 202 by controlling a valve or the like of the gas supply unit 74. Further, the control unit 63 controls liquid delivery from the liquid delivery unit 75 to the main probe 201 and the sub-probe 202 by controlling a pump or the like of the liquid delivery unit 75.

The data processing unit 64 performs data processing such as arithmetic processing on a detection signal input from the detector 245. A mass spectrum is generated by the processing of the data processing unit 64, and the generated mass spectrum is displayed on the display unit 72.

In the present embodiment, when the determination unit 62 determines that the standard sample is sprayed from the sub-probe 202, the control unit 63 controls the gas supply unit 74 to start gas supply from the gas supply unit 74 into the ionization chamber 20. More specifically, supply of the nebulizer gas from the main probe 201 into the ionization chamber 20 is started.

Further, in the present embodiment, after the standard sample is sprayed from the sub-probe 202, the control unit 63 controls the liquid delivery unit 75 to start supply of the cleaning solution from the liquid delivery unit 75 to the sub-probe 202. In this manner, the cleaning solution is sprayed from the sub-probe 202 into the ionization chamber 20.

5. Embodiment of Control by Control Unit

Figure 4:
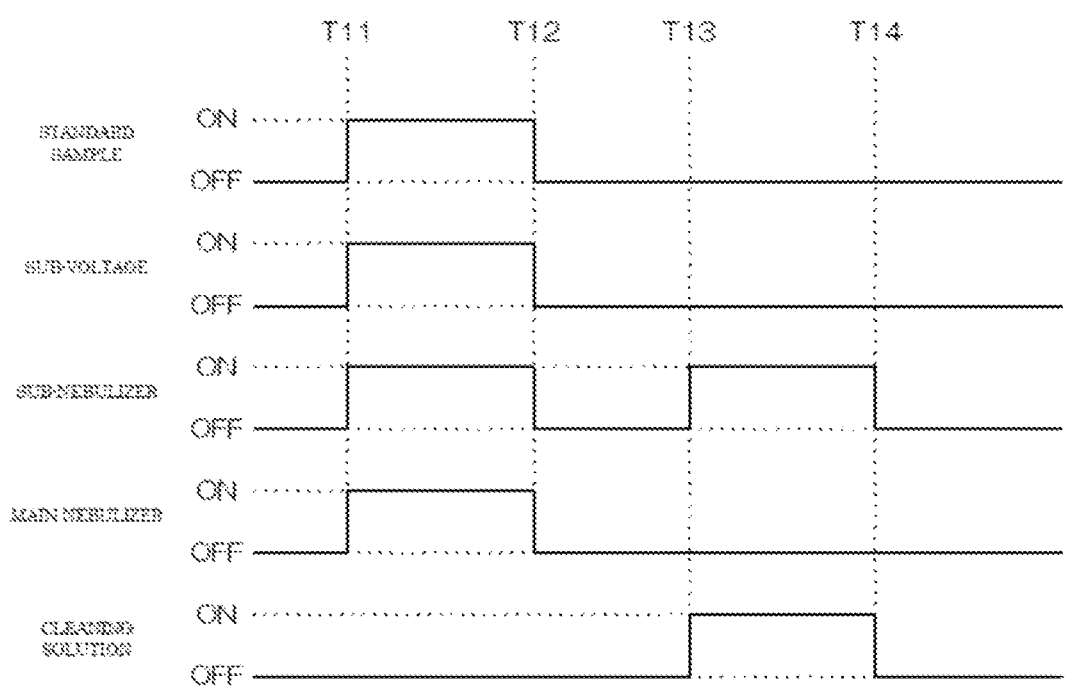
FIG. 4 is a timing chart for describing an embodiment of control by a control unit.
Figure 6:
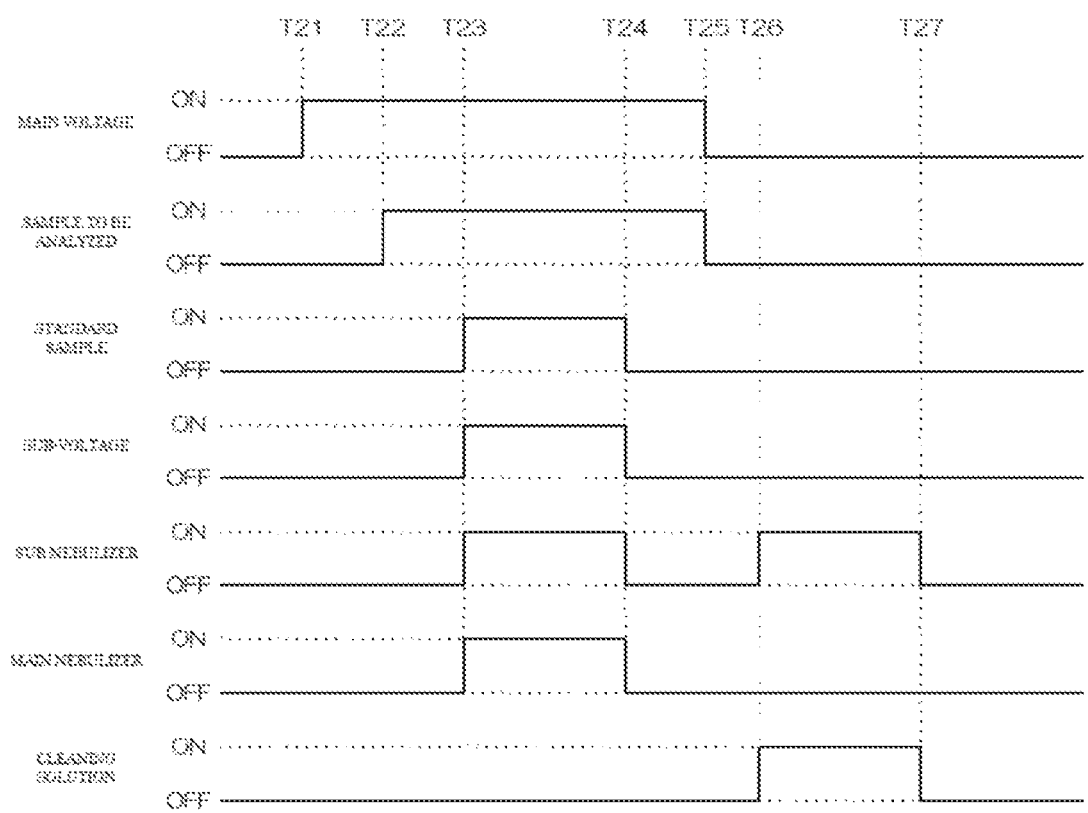

FIG. 4 is a timing chart for describing an embodiment of control by the control unit 63. In order to perform device calibration before an analysis, in a case where the user operates the operation unit 71 to issue a command to deliver a standard sample to the sub-probe 202, the control unit 63 performs control as illustrated in FIG. 4.

First, the control unit 63 controls the liquid delivery unit 75 to start delivery of the standard sample (timing T11). At the timing T11, the control unit 63 controls the voltage application unit 73 to start applying voltage to the sub-probe 202, and controls the gas supply unit 74 to start supplying the nebulizer gas from the sub-probe 202 into the ionization chamber 20. However, the command to start the delivery of the standard sample is not limited to that performed based on the operation of the operation unit 71 by the user, and may be automatically performed based on a program.

In the present embodiment, at the same time as the start timing T11 of the ionization of the standard sample by the sub-probe 202 as described above, the control unit 63 controls the gas supply unit 74 to start the supply of the nebulizer gas from the main probe 201 into the ionization chamber 20. However, the timing of starting the supply of the nebulizer gas from the main probe 201 does not need to be completely the same as the timing T11. For example, the supply of the nebulizer gas from the main probe 201 may be started at any timing during a period until the standard sample sprayed from the sub-probe 202 reaches the main probe 201 after the timing T11.

After the above, in a case where the user operates the operation unit 71 to issue a command to stop the delivery of the standard sample from the sub-probe 202, the control unit 63 controls the liquid delivery unit 75 to stop the delivery of the standard sample (timing T12). At the timing T12, the control unit 63 controls the voltage application unit 73 to stop the application of voltage to the sub-probe 202, and controls the gas supply unit 74 to stop the supply of the nebulizer gas from the sub-probe 202 into the ionization chamber 20. However, the command to stop the delivery of the standard sample is not limited to that performed based on the operation of the operation unit 71 by the user, and may be automatically performed based on a program.

At this time, the control unit 63 controls the gas supply unit 74 to stop the supply of the nebulizer gas from the main probe 201 into the ionization chamber 20 at the same time as the stop timing T12 for the ionization of the standard sample by the sub-probe 202. However, the timing of stopping the supply of the nebulizer gas from the main probe 201 does not need to be completely the same as the timing T12. For example, the supply of the nebulizer gas from the main probe 201 may be stopped at any timing during a period until the standard sample sprayed from the sub-probe 202 no longer reaches the main probe 201 after the timing T12.

After the control (timings T11 to T12) for ionization of the standard sample as described above is performed, the control unit 63 controls the liquid delivery unit 75 at an arbitrary timing to start delivery of the cleaning solution (timing T13). At the timing T13, the control unit 63 controls the gas supply unit 74 to start supply of the nebulizer gas from the sub-probe 202 into the ionization chamber 20. In this manner, spraying of the cleaning solution from the sub-probe 202 into the ionization chamber 20 is started.

Then, after predetermined time elapses, the control unit 63 controls the liquid delivery unit 75 to stop the delivery of the cleaning solution (timing T14). At the timing T14, the control unit 63 controls the gas supply unit 74 to stop the supply of the nebulizer gas from the sub-probe 202 into the ionization chamber 20. In this manner, spraying of the cleaning solution from the sub-probe 202 into the ionization chamber 20 is stopped.

6. Variation of Control by Control Unit

FIG. 5 is a timing chart for describing a variation of the control by the control unit 63. Mass calibration using a standard sample can be performed not only before an analysis but also during an analysis. In the example of FIG. 5, a case where mass calibration is performed during an analysis will be described.

In a case where the sample to be analyzed is analyzed at a low flow rate such as a micro flow rate or a nano flow rate, there is a case where the sample to be analyzed is ionized without injection of the nebulizer gas from the main probe 201. In this case, the control unit 63 controls the voltage application unit 73 to start only the application of voltage to the main probe 201 (timing T21).

Then, after predetermined time elapses, the control unit 63 controls the liquid delivery unit 75 to start delivery of the sample to be analyzed (timing T22). In a case where the sample to be analyzed is delivered at a low flow rate such as a micro flow rate or a nano flow rate, it is possible to ionize the sample to be analyzed only by application of voltage to the main probe 201.

After the ionization of the sample to be analyzed is started and mass spectrometry becomes possible in this manner, in a case where the user operates the operation unit 71 at an appropriate timing and a command to deliver a standard sample to the sub-probe 202 is issued, the control unit 63 controls the liquid delivery unit 75 to start delivery of the standard sample (timing T23). At the timing T23, the control unit 63 controls the voltage application unit 73 to start applying voltage to the sub-probe 202, and controls the gas supply unit 74 to start supplying the nebulizer gas from the sub-probe 202 into the ionization chamber 20. However, the command to start the delivery of the standard sample is not limited to that performed based on the operation of the operation unit 71 by the user, and may be automatically performed based on a program.

In this variation, at the same time as the start timing T23 of the ionization of the standard sample by the sub-probe 202 as described above, the control unit 63 controls the gas supply unit 74 to start the supply of the nebulizer gas from the main probe 201 into the ionization chamber 20. However, the timing of starting the supply of the nebulizer gas from the main probe 201 does not need to be completely the same as the timing T23. For example, the supply of the nebulizer gas from the main probe 201 may be started at any timing during a period until the standard sample sprayed from the sub-probe 202 reaches the main probe 201 after the timing T23.

After the above, in a case where the user operates the operation unit 71 to issue a command to stop the delivery of the standard sample from the sub-probe 202, the control unit 63 controls the liquid delivery unit 75 to stop the delivery of the standard sample (timing T24). At the timing T24, the control unit 63 controls the voltage application unit 73 to stop the application of voltage to the sub-probe 202, and controls the gas supply unit 74 to stop the supply of the nebulizer gas from the sub-probe 202 into the ionization chamber 20. However, the command to stop the delivery of the standard sample is not limited to that performed based on the operation of the operation unit 71 by the user, and may be automatically performed based on a program.

At this time, the control unit 63 controls the gas supply unit 74 to stop the supply of the nebulizer gas from the main probe 201 into the ionization chamber 20 at the same time as the stop timing T24 for the ionization of the standard sample by the sub-probe 202. However, the timing of stopping the supply of the nebulizer gas from the main probe 201 does not need to be completely the same as the timing T24. For example, the supply of the nebulizer gas from the main probe 201 may be stopped at any timing during a period until the standard sample sprayed from the sub-probe 202 no longer reaches the main probe 201 after the timing T24.

When the analysis of the sample to be analyzed is finished after the control for ionization of the standard sample as described above (timings T23 to T24) is performed, the control unit 63 controls the voltage application unit 73 to stop the application of voltage to the main probe 201 (timing T25). At the timing T25, the control unit 63 controls the liquid delivery unit 75 to also stop the delivery of the sample to be analyzed.

After the above, at an optional timing, the control unit 63 controls the liquid delivery unit 75 to start delivery of the cleaning solution (timing T26). At the timing T26, the control unit 63 controls the gas supply unit 74 to start supply of the nebulizer gas from the sub-probe 202 into the ionization chamber 20. In this manner, spraying of the cleaning solution from the sub-probe 202 into the ionization chamber 20 is started.

Then, after predetermined time elapses, the control unit 63 controls the liquid delivery unit 75 to stop the delivery of the cleaning solution (timing T27). At the timing T27, the control unit 63 controls the gas supply unit 74 to stop the supply of the nebulizer gas from the sub-probe 202 into the ionization chamber 20. In this manner, spraying of the cleaning solution from the sub-probe 202 into the ionization chamber 20 is stopped.

7. Other Variations

In a case where the determination unit 62 determines that the standard sample is sprayed from the sub-probe 202, the present invention is not limited to the configuration in which the supply of the nebulizer gas from the main probe 201 is started and may have a configuration in which supply of the heating gas from the main probe 201 is started. Alternatively, gas supply into the ionization chamber 20 may be started from a gas supply port provided separately from the main probe 201 and the sub-probe 202. In this case, the gas supply port may be provided in the vicinity of the main probe 201, or may inject gas in a direction away from the main probe 201. Further, the gas supply port may inject gas into a space between the main probe 201 and the sub-probe 202. In any case, these types of gas function to prevent the standard sample supplied from the sub-probe 202 or an ion derived from the standard sample from reaching the main probe 201 and to prevent the standard sample from adhering to the main probe 201.

The first sample sprayed from the main probe 201 is not limited to the sample to be analyzed. Further, the second sample sprayed from the sub-probe 202 is not limited to the standard sample for mass calibration. That is, the main probe 201 and the sub-probe 202 only need to spray different samples.

The sub-probe 202 is not limited to the configuration in which a sample is sprayed into a first space (the ionization chamber 20) common to the main probe 201. That is, the sub-probe 202 may be configured to spray a sample into a second space (for example, the first intermediate chamber 21) communicating with the first space.

The mass spectrometer to which the present invention is applied is not limited to a liquid chromatograph mass spectrometer, and may be, for example, a mass spectrometer into which a sample to be analyzed is directly introduced using a syringe pump or the like. Further, the mass spectrometer to which the present invention is applied is not limited to a Q-TOF type mass spectrometer, and may be another type of mass spectrometer such as an ion trap type mass spectrometer.

8. Aspect

It is understood by those skilled in the art that a plurality of the exemplary embodiments described above are specific examples of an aspect below.

(Item 1) A mass spectrometer according to an aspect may include:
- a first spray unit that sprays a first sample into a first space;
- a second spray unit that sprays a second sample into the first space or a second space communicating with the first space;
- a determination unit that determines whether or not the second sample is sprayed from the second spray unit;
- a gas supply unit that supplies gas that prevents the second sample sprayed into the first space or an ion derived from the second sample from reaching the first spray unit; and
- a control unit that controls supply of the gas from the gas supply unit.

The control unit may start the supply of the gas from the gas supply unit into the first space in a case where the determination unit determines that the second sample is sprayed from the second spray unit.

According to the mass spectrometer described in Item 1, when the second sample is sprayed from the second spray unit, the second sample sprayed from the second spray unit can be prevented from adhering to the first spray unit by the gas supplied from the gas supply unit into the first space.

(Item 2) In the mass spectrometer according to Item 1, the gas supply unit may supply, from the first spray unit into the first space, nebulizer gas for atomizing the first sample, and the control unit may start supply of the nebulizer gas from the first spray unit into the first space in a case where the determination unit determines that the second sample is sprayed from the second spray unit.

According to the mass spectrometer described in Item 2, when the second sample is sprayed from the second spray unit, the second sample sprayed from the second spray unit can be prevented from adhering to the first spray unit by nebulizer gas supplied from the first spray unit into the first space.

(Item 3) In the mass spectrometer described in Item 1, the gas supply unit may supply, from the first spray unit into the first space, heating gas for heating the first sample that is atomized, and the control unit may start supply of the heating gas from the first spray unit into the first space in a case where the determination unit determines that the second sample is sprayed from the second spray unit.

According to the mass spectrometer described in Item 3, when the second sample is sprayed from the second spray unit, the second sample sprayed from the second spray unit can be prevented from adhering to the first spray unit by heating gas supplied from the first spray unit into the first space.

(Item 4) In the mass spectrometer described in any one of Items 1 to 3, the first sample may be a sample to be analyzed, and the second sample may be a standard sample for mass calibration.

According to the mass spectrometer described in Item 4, when the standard sample for mass calibration is sprayed from the second spray unit, the standard sample sprayed from the second spray unit can be prevented from adhering to the first spray unit that sprays the sample to be analyzed by the gas supplied from the gas supply unit into the first space.

(Item 5) In the mass spectrometer described in any one of Items 1 to 4, the first spray unit may have an introduction path through which the first sample is introduced, an inner diameter of the introduction path may be 10 to 100 μm, and a flow rate of the first sample in the introduction path may be 50 μL/min or less.

According to the mass spectrometer described in Item 5, in the mass spectrometer in which the first sample is introduced from the first spray unit at a low flow rate, the second sample sprayed from the second spray unit can be prevented from adhering to the first spray unit. In a case where the inner diameter of the introduction path for introducing the first sample is a small diameter of 10 to 100 μm, the second sample sprayed from the second spray unit is likely to clog the introduction path, which is particularly effective.

(Item 6) In the mass spectrometer described in any one of claims 1 to 5, a liquid delivery unit that supplies cleaning solution to the second spray unit may be further included, and after the second sample is sprayed from the second spray unit, the control unit may cause the liquid delivery unit to start supply of the cleaning solution and cause the second spray unit to spray the cleaning solution.

According to the mass spectrometer described in Item 6, since the first spray unit is cleaned by the cleaning solution sprayed from the second spray unit, the second sample can be more effectively prevented from adhering to the first spray unit.

(Item 7) In the mass spectrometer described in Item 6, the cleaning solution may contain any one of water, acetonitrile, methanol, ethanol, and isopropanol.

According to the mass spectrometer described in Item 7, the first spray unit can be cleaned using the cleaning solution having little influence on an analysis. If the cleaning solution is an organic solvent, the second sample is easily dissolved in the cleaning solution, so that adhesion of the second sample to the first spray unit can be more effectively prevented.

9. Other Aspects

The mass spectrometer according to other aspects may include:

a first spray unit that sprays a first sample into a first space;

a second spray unit that sprays a second sample into the first space or a second space communicating with the first space;

a liquid delivery unit that supplies cleaning solution to the second spray unit; and a control unit that causes the liquid delivery unit to start supply of the cleaning solution and causes the second spray unit to spray the cleaning solution after the second sample is sprayed from the second spray unit.

DESCRIPTION OF REFERENCE SIGNS

1 liquid chromatograph unit
2 mass spectrometry unit
3 capillary
6 control device
20 ionization chamber
21 first intermediate chamber
22 second intermediate chamber
23 third intermediate chamber
24 analysis chamber
31 capillary
61 operation receiving unit
62 determination unit
63 control unit
64 data processing unit
71 operation unit
72 display unit
73 voltage application unit
74 gas supply unit
75 liquid delivery unit
201 main probe
202 sub-probe

The invention claimed is:

1. A mass spectrometer comprising:

a first spray unit that sprays a first sample into a first space;

a second spray unit that sprays a second sample into the first space or a second space communicating with the first space;

a determination unit that determines whether or not the second sample is sprayed from the second spray unit;

a gas supply unit that supplies gas that prevents the second sample sprayed into the first space or an ion derived from the second sample from reaching the first spray unit; and a control unit that controls supply of the gas from the gas supply unit, wherein the control unit starts the supply of the gas from the gas supply unit into the first space in a case where the determination unit determines that the second sample is sprayed from the second spray unit.

2. The mass spectrometer according to claim 1, wherein the gas supply unit supplies, from the first spray unit into the first space, nebulizer gas for atomizing the first sample, and the control unit starts supply of the nebulizer gas from the first spray unit into the first space in a case where the determination unit determines that the second sample is sprayed from the second spray unit.

3. The mass spectrometer according to claim 1, wherein the gas supply unit supplies, from the first spray unit into the first space, heating gas for heating the first sample that is atomized, and the control unit starts supply of the heating gas from the first spray unit into the first space in a case where the determination unit determines that the second sample is sprayed from the second spray unit.

4. The mass spectrometer according to claim 1, wherein the first sample is a sample to be analyzed, and the second sample is a standard sample for mass calibration.

5. The mass spectrometer according to claim 1, wherein the first spray unit has an introduction path through which the first sample is introduced, an inner diameter of the introduction path is 10 to 100 μm, and a flow rate of the first sample in the introduction path is 50 μL/min or less.

6. The mass spectrometer according to claim 1, further comprising a liquid delivery unit that supplies cleaning solution to the second spray unit, wherein after the second sample is sprayed from the second spray unit, the control unit causes the liquid delivery unit to start supply of the cleaning solution and causes the second spray unit to spray the cleaning solution.

7. The mass spectrometer according to claim 6, wherein the cleaning solution contains any one of water, acetonitrile, methanol, ethanol, and isopropanol.

* * * * *